United States Patent Office
2,995,424
Patented Aug. 8, 1961

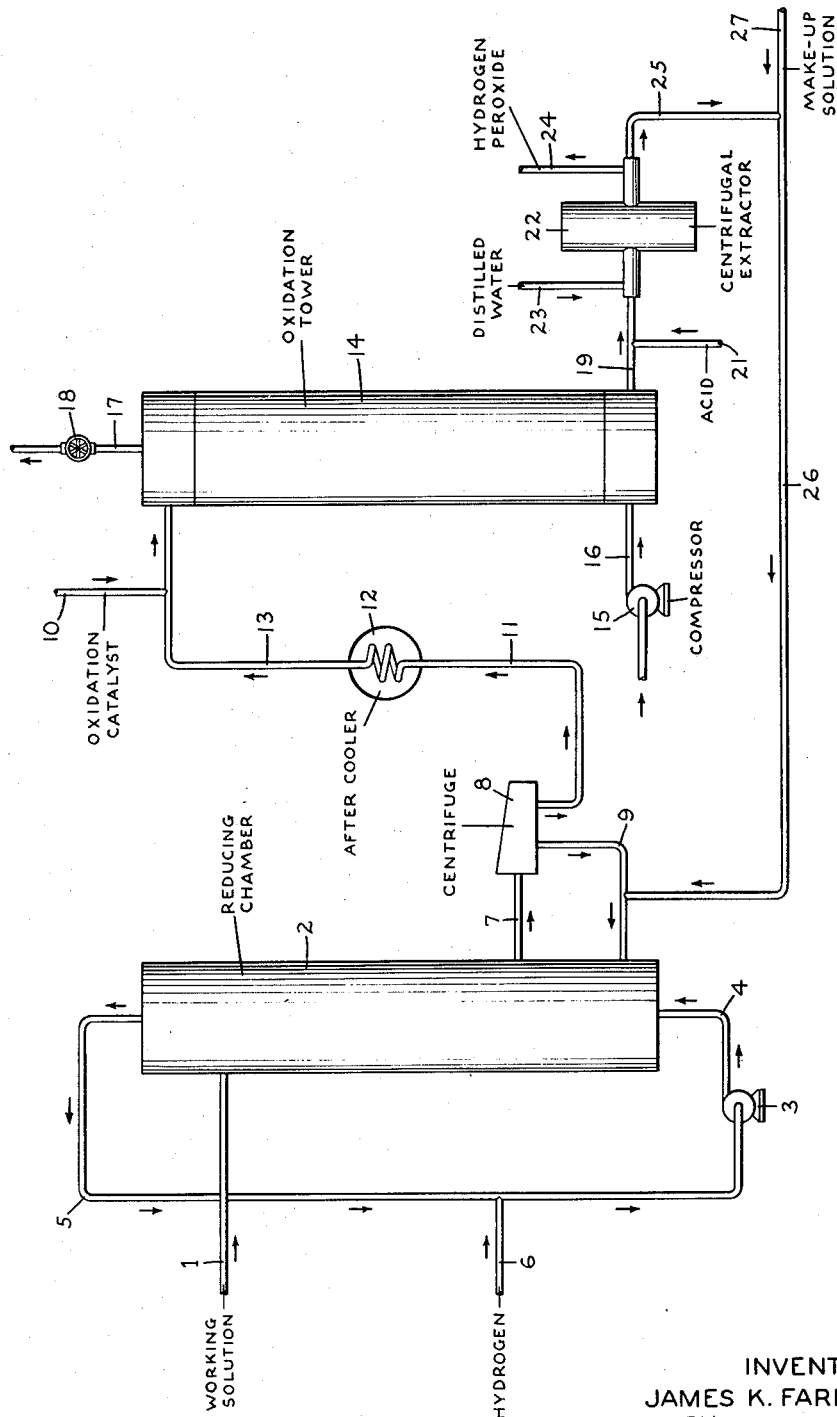

2,995,424
HYDROGEN PEROXIDE VIA TETRAHYDRO-ANTHRAQUINONE
James K. Farrell, Syracuse, N.Y., assignor to Allied Chemical Corporation, New York, N.Y., a corporation of New York
Filed Oct. 6, 1958, Ser. No. 765,367
10 Claims. (Cl. 23—207)

This invention relates to the production of hydrogen peroxide and more particularly refers to a new and improved process for the production of hydrogen peroxide by a cyclic operation involving the reduction of a quinone compound, oxidation of the hydroquinone compound produced, and separation of the thus formed hydrogen peroxide.

The anthraquinone process for the production of hydrogen peroxide as commercially practiced and described in the literature is a cyclic operation in which an anthraquinone compound dissolved in a water-immiscible solvent is hydrogenated to a hydroquinone compound in the presence of a catalyst, the hydroquinone compound is oxidized to the quinone compound with formation of hydrogen peroxide, and the hydrogen peroxide formed during the oxidation extracted with water. In the hydrogenation of the anthraquinone compound to the corresponding hydroquinone one of the side reactions leads to the addition of hydrogen to the aromatic nucleus of the anthraquinone compound forming the tetrahydroanthraquinone compound. In the course of repeated cyclic operations the anthraquinone compound becomes converted to the tetrahydroanthraquinone compound to an extent of sixty or more percent of the original anthraquinone compound. The formation of tetrahydroquinone in the anthraquinone process for the production of hydrogen peroxide has been objectionable because it is four to six times as difficult to oxidize as the corresponding anthraquinone compound. The effect of the presence of substantial quantities of tetrahydroquinone compound in the working solution is to seriously reduce the capacity of the plant for producing hydrogen peroxide and may mean the difference between running the operation at a loss or profit. The art recognized the problem of tetrahydroanthraquinone formation in the hydrogen peroxide process and considerable work has been done in an attempt to minimize this inherent difficulty. One suggestion, U.S. Patent 2,673,140, was to limit the degree of hydrogenation to a level of about 60% instead of 100% by maintaining the hydrogen gas partial pressure to 0.9 atmosphere or less. Obviously, such procedure reduces the potential hydrogenation capacity. Furthermore, even at reduced hydrogenation levels tetrahydroanthraquinone continues to form at a measurable rate and accumulates in the system. Rosenmunde and co-workers found that some degree of control of catalyst activity to reduce ring hydrogenation could be obtained by the use of amines. Similar claims, U.S. Patents 2,720,531 and 2,720,532 are made for organic nitrites and nitriles. Although some reduction in the rate of tetrahydroquinone can be thus effected, the formation is not prevented and it continues to be a serious problem. In another method as described in U.S. Patent 2,739,042 the working solution containing tetrahydroquinone was given a special separate catalytic treatment to convert it to the corresponding anthraquinone. While this method was successful in maintaining the capacity of the hydrogen peroxide process nevertheless it entailed considerable cost for treating and converting the tetrahydroquinone.

An object of the present invention is to provide a more efficient method of producing hydrogen peroxide via alkylated anthraquinones in which the working solution contains substantial amounts of tetrahydroquinone compound.

Another object of the present invention is to provide a method of maintaining high productivity of hydrogen peroxide in a process for the production of hydrogen peroxide via alkylated anthraquinones in which nuclear hydrogenation occurs.

A further object of the present invention is to provide an efficient method of producing hydrogen peroxide in a cyclic process involving hydrogenation of mixtures containing an alkylated tetrahydroquinone compound dissolved in a water-immiscible solvent, oxidation of the resulting tetrahydroanthraquinone dissolved in the water-immiscible solvent, and water extraction of the hydrogen peroxide formed during oxidation. Other objects and advantages of the invention will be apparent from the following description and accompanying drawing.

In accordance with the present invention hydrogen peroxide is continuously produced by a cyclic process involving hydrogenating a working solution containing an alkylated tetrahydroanthraquinone dissolved in a water-immiscible solvent to convert the alkylated tetrahydroanthraquinone to the alkylated tetrahydroanthrahydroquinone, subjecting the hydrogenated working solution to oxidation in the presence of a small amount, within the range of about 0.002% to about 0.25%, preferably 0.005% to 0.02%, by weight of a water-soluble ionizable inorganic alkaline compound with elemental oxygen in the form of pure oxygen or a gas containing elemental oxygen to produce alkylated tetrahydroanthraquinone and hydrogen peroxide and extracting hydrogen peroxide from said oxidized solution by passing the oxidized solution in intimate contact with water.

In a more specific embodiment of the invention a working solution comprising an alkylated anthraquinone such as methyl-, ethyl-, propyl-, iso-butyl-, dissolved in a mixed solvent of two or more constituents consisting of a constituent capable of dissolving the quinone form such as an aromatic hydrocarbon, e.g. benzene, toluene and xylene, a constituent capable of dissolving the hydroquinone form such as an alcohol having from 5 to 12 carbon atoms in the molecule as for example amyl alcohol, cyclohexanol, methyl cyclohexanol, octyl alcohol, nonyl alcohol and decyl alcohol, and a synergistic solvent such as a ketone, e.g. acetophenone, is in a continuous cyclic operation subjected to hydrogenation in the presence of a palladium catalyst to convert the anthraquinone to the hydroquinone with concomitant formation as a side reaction of tetrahydroanthraquinone resulting from the addition of hydrogen to the aromatic nucleus of the anthraquinone, subjecting the hydrogenated working solution to oxidation in the presence of a small amount, within the range of 0.005% to 0.02% by weight of sodium hydroxide or ammonium hydroxide, preferably ammonium hydroxide, with elemental oxygen in the form of pure oxygen or a gas containing elemental oxygen to convert the anthrahydroquinones to the corresponding anthraquinones and produce hydrogen peroxide, adding a small amount of acid to the oxidized working solution in an amount about equal to or greater than the amount of oxidation catalyst, generally within the range of 0.002% to 0.5% by weight, and extracting hydrogen peroxide from said oxidized solution by passing the oxidized solution in intimate contact with water, and recycling the resultant working solution for further hydrogenation.

Basic chemical reactions in the process for the production of hydrogen peroxide via anthraquinones is illustrated by the following equations:

(1)

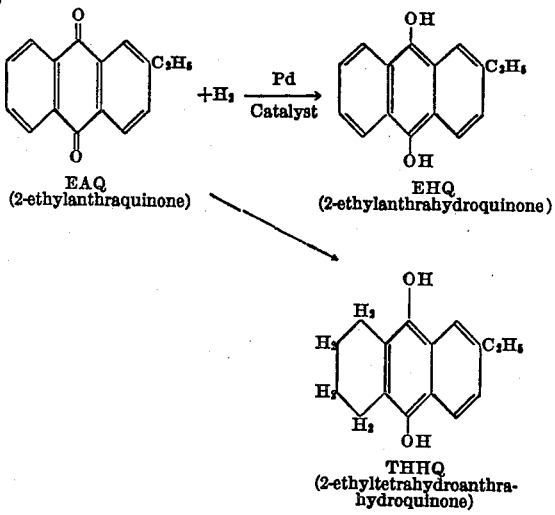

(2)

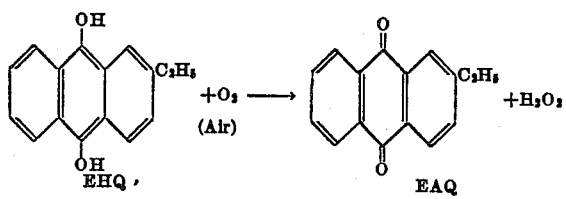

(3)

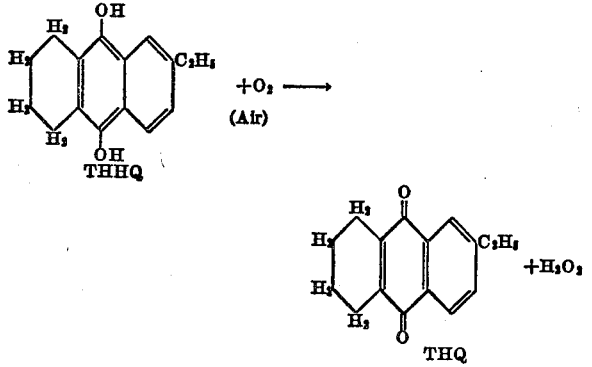

As will be noted from Equation 1 above, hydrogenation of anthraquinone in the presence of a palladium catalyst produces as a primary reaction anthrahydroquinone and as a side reaction a portion of the anthraquinone is converted to the tetrahydroanthraquinone compound as well as a very small amount of non-peroxide producing by-products of unknown composition. As a practical matter the working solution must be recycled many times, usually five hundred or more times, thus subjecting the anthraquinone to an equivalent number of hydrogenations with consequent formation of the corresponding tetrahydroanthraquinone in each cycle which accumulates in the working system displacing the anthraquinone often to an extent of sixty or more percent. Although the tetrahydroanthraquinone formed in a side reaction during the hydrogenation step may be used as a working compound in the hydrogen peroxide process, unfortunately the oxidation of the tetrahydroanthrahydroquinone proceeds at a rate of about one-fifth the rate at which the anthrahydroquinone oxidizes. The oxidation of anthrahydroquinone and tetrahydroanthrahydroquinone is illustrated in Equations 2 and 3 above. Merely as illustrative, oxidation of ethylanthrahydroquinone will occur in about three to five minutes whereas oxidation of the corresponding ethyltetrahydroanthrahydroquinone, under the same conditions, requires twenty to twenty-five minutes.

The art sought to overcome this difficulty inherent in the anthraquinone process for the production of hydrogen peroxide by attempting to slow down the formation of tetrahydroanthraquinone by process control, as for example, by operating the hydrogenation step at a reduced level, i.e. hydrogenating only about 60% of the anthraquinone compound.

The present invention is based on a new and different approach—the utilization of the tetrahydroquinone compound as an active working constituent for production of hydrogen peroxide without any attempt made to retard the formation of tetrahydroanthraquinone or removal of the tetrahydroanthraquinone. This is based on the discovery that the addition of relatively minute amounts of oxidation catalyst within the range of 0.002% to 0.25%, preferably within the range of 0.005% to 0.02% based on the weight of the working solution when added to the working solution undergoing oxidation would surprisingly increase the rate of oxidation of the tetrahydroanthrahydroquinone compound four to six times, e.g. reduce the time of oxidation from about 20-25 minutes to about 3-5 minutes. Quantities of such oxidation catalyst substantially in excess of 0.25% are not effective for increasing the rate of oxidation and usually act as an accelerator to produce undesired by-products and causes decomposition of hydrogen peroxide with loss of the desired product. The oxidation catalysts of the present invention when added to the working solution undergoing oxidation tend to cause the formation of emulsions with the water used for extracting the hydrogen peroxide from the oxidized working solution probably due to reaction with by-products to form surface active materials. The addition of an acid in an amount equal to or greater than the amount of oxidation catalyst has been found to overcome the tendency to emulsify and the hydrogen peroxide may be readily extracted from the oxidized working solution with water without difficulty of emulsification.

The oxidation catalysts of the present invention are ionizable water-soluble compounds having an alkaline reaction. I have found that there is direct relation between the degree of water solubility and the catalytic effectiveness of the alkaline compound employed; the more water soluble it is, the more effective it becomes as an oxidation catalyst. While the mechanism of the catalysis is not known, it appears that water, and/or hydrogen peroxide, is essential in one or more steps of the oxidation using alkaline catalysts. Organic alkaline compounds are undesirable for many reasons, among which are ineffectiveness as an oxidation catalyst compared to the water-soluble ionizable inorganic alkaline compounds of the present invention, tend to contaminate the hydrogen peroxide product and complicate purification and concentration of the hydrogen peroxide product, tend to reduce the life of the palladium catalyst, and are economically disadvantageous because they are more expensive than the oxidation catalysts of the present invention.

Examples of the oxidation catalysts are ammonium hydroxide, sodium hydroxide, potassium hydroxide, sodium carbonate, calcium hydroxide and magnesium hydroxide. Although not preferred, barium and calcium carbonates may be employed. The preferred oxidation catalysts are the alkali metal hydroxides and ammonium hydroxide. Of these hydroxides ammonium hydroxide and sodium hydroxide appear to be best. Ammonium hydroxide is superior to sodium hydroxide in that a smaller quantity of ammonium hydroxide as compared to sodium hydroxide has been found to be effective as a catalyst and additionally, ammonium hydroxide being volatile can be more readily separated from the reaction products.

The accompanying drawing diagrammatically illustrates one method of carrying out the invention.

A working solution is first prepared composed of a quinone compound dissolved in a solvent medium, preferably a mixed solvent with three constituents consisting of a constituent capable of dissolving the quinone such as an aromatic hydrocarbon, e.g. xylene, a constituent capable of dissolving the hydroquinone formed, such as an alcohol, e.g. octanol-2, and a synergistic solvent, e.g. a ketone such as acetophenone. The quinone compounds used as the solute are anthraquinone and derivatives of anthraquinone such as methyl-, ethyl-, propyl-, iso-, tert.-, and butyl-anthraquinones, the corresponding nuclear hydrogenated anthraquinones and anthrahydroquinones. The mixture termed working solution is usually composed of about 10–25% quinone compound, 10 to 60% ketone compound, with the balance made up of the aromatic hydrocarbon and alcohol solvents. An illustrative example illustrating the composition of a typical initial working solution would be 15% 2-ethylanthraquinone, 20% xylene, 40% acetophenone and 25% octanol-2. During the course of operation by reduction and oxidation to produce hydrogen peroxide nuclear hydrogenation occurs as a side reaction and after repeated cyclic operations the tetrahydroquinone formed will increase with corresponding decrease of the anthraquinone formed in the working solution until after repeated cyclic operations sixty or more percent of the anthraquinone compound initially present in the working solution will be converted to the tetrahydroanthraquinone form. If desired the initial working solution may contain a mixture of anthraquinone and tetrahydroquinone compounds or may contain only tetrahydroquinone compound as a quinone constituent. The working solution in the cyclic operation will, after hydrogenation, contain the quinone compound predominantly or entirely in the anthrahydroquinone form and after the oxidation reaction the quinone compound will be predominantly or entirely in the anthraquinone form.

The working solution is introduced through line 1 in a reducing chamber 2 maintained in a temperature range of about 20–50° C. under substantially atmospheric pressure of about 1–5 p.s.i.g. To the working solution is added, through line 1, hydrogenation catalyst such as palladium or platinum, preferably palladium, disposed on a solid support. The preferred catalyst consists of about 5% palladium on a charcoal or alumina carrier. The amount of catalyst required is approximately 1–10% by weight of the quinone present. Hydrogen is forced by pump 3 through line 4 into the bottom of reducing chamber 2 in intimate contact with a body of working solution containing suspended catalyst. Sufficient agitation to produce the necessary interfacial area for reasonable reaction rate and to maintain necessary suspension of catalyst is supplied by circulation of the hydrogen gas stream which is released from the top of chamber 2 through line 5 to the suction side of compressor 3. The hydrogen necessary to sustain the reaction is added to the circulating stream of hydrogen via line 6. The hydrogenation reaction may be carried to a high level approaching or at the level of 100% thus enhancing the efficiency of the operation. Previously care had to be taken to avoid exceeding a level of about 60% hydrogenation in order to minimize nuclear hydrogenation. In the present invention nuclear hydrogenated quinone compounds are no longer a handicap to the production of hydrogen peroxide and therefore the hydrogenation reaction may be carried out to its full potentialities.

The hydrogenated solution containing suspended catalyst is discharged from reducer 2 through line 7 into centrifuge 8 wherein the catalyst is separated from the solution and returned via line 9 to reducing chamber 2. The working solution, after removal of catalyst in centrifuge 8 flows through line 11 into after-cooler 12 wherein some of the exothermic heat of reaction resulting from the hydrogenation is removed by indirect heat exchange with cooling water and the cooled solution introduced through line 13 into the top of oxidation tower 14 which desirably is a vertical column filled with packing such as Berl saddles or glass beads. A small amount, about 0.005% to 0.02%, by weight of oxidation catalyst, such as ammonium hydroxide or sodium hydroxide may be added to the working solution through line 10 or may be introduced directly into oxidation tower 14. The primary reaction in oxidation tower 14 is the oxidation of the anthrahydroquinone compounds in the working solution to the anthraquinone form with hydrogen peroxide splitting off during the reaction. The oxidation of the anthahydroquinone compounds may be accomplished from below room temperature to about 40° C. or more, preferably about 25–35° C. Oxidation may be accomplished at atmospheric pressure and preferably under superatmospheric pressure by passing an oxygen-containing gas, preferably air, by means of compressor 15 through line 16 into oxidation tower 14. The off-gases released from th top of oxidation tower 14 through line 17 and valve 18 consist principally of nitrogen and usually contain less than 1% oxygen. The oxidation catalyst effects more complete and rapid utilization of the oxygen in the air thereby effecting a saving in the amount of oxygen-containing gas used and also producing a substantially pure nitrogen which may be used in the plant for blanketing purposes.

The products of the oxidation reaction withdrawn from the bottom of oxidation tower 14 through line 19 containing about 1.5% hydrogen peroxide are then subjected to water extraction to separate the hydrogen peroxide from the working solution. It was found that the presence of the oxidation catalyst tends to form emulsions when extracting the hydrogen peroxide with water from the working solution making the extraction operation difficult particularly on a large scale commercial operation. To negate the emulsion forming tendency of the oxidation catalyst a mineral acid such as sulfuric acid or phosphoric acid is added through line 21 to the working solution. In practice it has been found that the amount of acid required is small, usually an amount by weight equal to and up to three to four times the amount of oxidation catalyst will be adequate or stated in terms of percentage an amount of acid based on the weight of working solution of about 0.002% to about 0.5%. Reaction products from line 16 are fed to centrifugal extractor 22 into which distilled water through line 23 in contact with working solution resulting in a water solution containing about 10–20% dissolved hydrogen peroxide together with small amounts of impurities which are withdrawn from extractor 22 through line 24 and may, if a purer and more concentrated solution is required, be subjected to further purification and fractionation. Working solution removed from extractor 22 through line 25 is recycled to reducer 2 via line 26. Make-up solution may be added from time to time through line 27 to replace that lost from mechanical losses and chemical degradation.

The following examples illustrate the present invention.

*Example 1*

A working solution comprising a mixed solvent in the proportion of 34.1 parts by weight acetophenone, 27.1 parts by weight capryl alcohol, and 23.7 parts by weight xylene and containing as a solute 15.1% by weight of a mixture of 2-ethyltetrahydroanthraquinone and 2-ethylanthraquinone of which the tetrahydroanthraquinone constituted 61% of the total ethyltetrahydroanthraquinone and ethylanthraquinone was subjected to repeated cyclic operations each cycle involving hydrogenation of the working solution, oxidation of the working solution, and extraction with water of the hydrogen peroxide from the oxidized working solution. The hydrogenation reaction is carried out by passing hydrogen through the working solution containing 0.5% catalyst consisting of 5% palladium deposited on carbon carrier at a temperature of 25° C. until 1200 volumes of hydrogen per 100 volumes of working solution were absorbed. The catalyst was then separated from the hydrogenated working solution and the working solution then subjected to oxidation at a temperature of 30° C. by passing air up through the hydrogenated working solution until 1000 volumes of oxygen per 100 volumes of working solution were absorbed by the working solution. The oxidized working solution was then scrubbed with water to remove the hydrogen peroxide product and the working solution then returned for further hydrogenation to start another cycle.

In the above operation the time required for effecting oxidation of working solution in each cycle requires 20–27 minutes.

In a series of comparative cycle operations in accordance with the practice of the present invention 0.03 part by weight of the working solution of sodium hydroxide was added to the working solution and subjected to oxidation. The time required for effecting the oxidation, i.e. absorbing 1000 volumes of oxygen per 100 volumes of working solution, was 4–5 minutes. To the oxidized working solution was added 0.05% by weight of working solution of sulfuric acid and hydrogen peroxide was then extracted from the working solution with water without any difficulty due to emulsification.

*Example 2*

A working solution comprising a mixed solvent in the proportion of 27.4 parts by weight acetophenone, 28.7 parts by weight capryl alcohol, and 27.0 parts by weight xylene and containing as a solute 16.9% by weight of a mixture of 2-ethyltetrahydronanthraquinone and 2-ethylanthraquinone of which the tetrahydroanthraquinone constituted 61.5% of the total ethyltetrasydroanthraquinone and ethylanthraquinone was subjected to repeated cyclic operations each cycle involving hydrogenation of the working solution, oxidation of the working solution, and extraction with water of the hydrogen peroxide from the oxidized working solution. The hydrogenation reaction is carried out by passing hydrogen through the working solution containing 0.5% catalyst consisting of 5% palladium deposited on carbon carrier at a temperature of 25° C. until 1200 volumes of hydrogen per 100 volumes of working solution were absorbed. The catalyst was then separated from the hydrogenated working solution and the working solution then subjected to oxidation at a temperature of 30° C. by passing air up through the hydrogenated working solution until 1000 volumes of oxygen per 100 volumes of working solution were absorbed by the working solution. The oxidized working solution was then scrubbed with water to remove the hydrogen peroxide product and the working solution then returned for further hydrogenation to start another cycle.

In the above operation the time required for effecting oxidation of working solution in each cycle requires 17 minutes, 50 seconds to 20 minutes.

In a series of comparative cyclic operations in accordance with the practice of the present invention 0.04 part by weight of the working solution of sodium hydroxide was added to the working solution and subjected to oxidation. The time required for effecting the oxidation, i.e. absorbing 1000 volumes of oxygen per 100 volumes of working solution, was 3 minutes, 17 seconds to 3 minutes, 50 seconds. To the oxidized working solution was added 0.06% by weight of working solution of sulfuric acid and hydrogen peroxide was then extracted from the working solution with water without any difficulty due to emulsification.

*Example 3*

A working solution comprising a mixed solvent in the proportion of 26.5 parts by weight acetophenone, 32.7 parts by weight capryl alcohol, and 25.1 parts by weight xylene and containing as a solute 15.7% by weight of a mixture of 2-ethyltetrahydroanthraquinone and 2-ethylanthraquinone of which the tetrahydroanthraquinone constituted 51% of the total ethyltetrahydroanthraquinone and ethylanthraquinone was subjected to repeated cyclic operations each cycle involving hydrogenation of the working solution, oxidation of the working solution, and extraction with water of the hydrogen peroxide from the oxidized working solution. The hydrogenation reaction is carried out by passing hydrogen through the working solution containing 0.5% catalyst consisting of 5% palladium deposited on carbon carrier at a temperature of 25° C. until 1400 volumes of hydrogen per 100 volumes of working solution were absorbed. The catalyst was then separated from the hydrogenated working solution and the working solution then subjected to oxidation at a temperature of 30° C. by passing air up through the hydrogenated working solution until 1200 volumes of oxygen per 100 volumes of working solution were absorbed by the working solution. The oxidized working solution was then scrubbed with water to remove the hydrogen peroxide product and the working solution then returned for further hydrogenation to start another cycle.

In the above operation the time required for effecting oxidation of working solution in each cycle requires 16 minutes.

In a series of compartive cyclic operations in accordance with the practice of the present invention 0.01 part by weight of the working solution of ammonia was added to the working solution and subjected to oxidation. The time required for effecting the oxidation, i.e. absorbing 1200 volumes of oxygen per 100 volumes of working solution, was 4 minutes. To the oxidized working solution was added 0.02% by weight of working solution of sulfuric acid and hydrogen peroxide was then extracted from the working solution with water without any difficulty due to emulsification.

*Example 4*

In an operation under conditions the same as Example 3 above the amount of ammonia was increased to 0.05%, the time required for oxidation was reduced to 2.52 minutes.

*Example 5*

A working solution comprising a mixed solvent in the proportion of 24.6 parts by weight acetophenone, 30.3 parts by weight capryl alcohol, and 29.8 parts by weight xylene and cotnaining as a solute 15.3% by weight of a mixture of 2-ethyltetrahydroanthraquinone and 2-ethylanthraquinone of which the tetrahydroanthraquinone constituted 66% of the total ethyltetrahydroanthraquinone and ethylanthraquinone was subjected to repeated cyclic operations each cycle involving hydrogenation of the working solution, oxidation of the working solution, and extraction with water of the hydrogen peroxide from the oxidized working solution. The hydrogenation reaction is carried out by passing hydrogen through the working solution containing 0.5% catalyst consisting of 5% palladium deposited on carbon carrier at a temperature of 25° C., untli 1100 volumes of hydrogen per 100 volumes of working solution were absorbed. The catalyst was then separated from the hydrogenated working solution and the working solution then subjected to oxidation at a temperature of 30° C. by passing air up through the hydrogenated working solution until 950 volumes of oxygen per 100 volumes of working solution were absorbd by the working solution. The oxidized working solution was then scrubbed with water to remove the hydrogen peroxide product and the working solution then returned for further hydrogenation to start another cycle.

In the above operation the time required for effecting oxidation of working solution in each cycle requires 15 minutes, 10 seconds.

In a series of comparative cyclic operations in accordance with the practice of the present invention 0.02 part by weight of the working solution of sodium carbonate was added to the working solution and subjected to oxidation. The time required for effecting the oxidation, i.e.

absorbing 950 volumes of oxygen per 100 volumes of working solution, was 11 minutes, 20 seconds. To the oxidized working solution was added 0.04% by weight of working solution of sulfuric acid and hydrogen peroxide was then extracted from the working solution with water without any difficulty due to emulsification.

*Example 6*

In an operation under conditions the same as Example 5 above the amount of sodium carbonate was increased to 0.05%, the time required for oxidation was reduced to 5.0 minutes.

Although certain preferred embodiments of the invention have been disclosed for purpose of illustration, it will be evident that various changes and modifications may be made therein without departing from the scope and spirit of the invention.

I claim:

1. In a cyclic process for the production of hydrogen peroxide involving hydrogenating a working solution comprising a tetrahydroanthraquinone compound dissolved in a water-immiscible solvent to convert the tetrahydroanthraquinone compound to the corresponding tetrahydroanthrahydroquinone compound, oxidizing the hydrogenated working solution with elemental oxygen to produce the tetrahydroanthraquinone compound and hydrogen peroxide, and separating hydrogen peroxide from the oxidized working solution, and recycling the oxidized working solution for further hydrogenation the improvement which comprises effecting oxidation of the working solution in the presence of a small amount, within the range of about 0.002% to about 0.25%, by weight of a water soluble ionizable inorganic alkaline compound.

2. In a cyclic process for the production of hydrogen peroxide involving hydrogenating a working solution comprising a tetrahydroanthraquinone compound dissolved in a water-immiscible solvent to convert the tetrahydroanthraquinone compound to the corresponding tetrahydroanthrahydroquinone compound, oxidizing the hydrogenated working solution with elemental oxygen to produce the tetrahydroanthraquinone compound and hydrogen peroxide, and separating hydrogen peroxide from the oxidized working solution, and recycling the oxidized working solution for further hydrogenation the improvement which comprises effecting oxidation of the working solution in the presence of a small amount, within the range of about 0.005% to 0.02%, by weight of a water-soluble ionizable inorganic alkaline compound.

3. In a cyclic process for the production of hydrogen peroxide involving hydrogenating a working solution comprising a tetrahydroanthraquinone compound dissolved in a water-immiscible solvent to convert the tetrahydroanthraquinone compound to the corresponding tetrahydroanthrahydroquinone compound, oxidizing the hydrogenated working solution with elemental oxygen to produce the tetrahydroanthraquinone compound and hydrogen peroxide, and separating hydrogen peroxide from the oxidized working solution, and recycling the oxidized working solution for further hydrogenation the improvement which comprises effecting oxidation of the working solution in the presence of a small amount, within the range of about 0.002% to about 0.25%, by weight an alkali metal hydroxide.

4. In a cyclic process for the production of hydrogen peroxide involving hydrogenating a working solution comprising a tetrahydroanthraquinone compound dissolved in a water-immiscible solvent to convert the tetrahydroanthraquinone compound to the corresponding tetrahydroanthrahydroquinone compound, oxidizing the hydrogenated working solution with elemental oxygen to produce the tetrahydroanthraquinone compound and hydrogen peroxide, and separating hydrogen peroxide from the oxidized working solution, and recycling the oxidized working solution for further hydrogenation the improvement which comprises effecting oxidation of the working solution in the presence of a small amount, within the range of about 0.002% to about 0.25%, by weight of sodium hydroxide.

5. In a cyclic process for the production of hydrogen peroxide involving hydrogenating a working solution comprising a tetrahydroanthraquinone compound dissolved in a water-immiscible solvent to convert the tetrahydroanthraquinone compound to the corresponding tetrahydroanthrahydroquinone compound, oxidizing the hydrogenated working solution with elemental oxygen to produce the tetrahydroanthraquinone compound and hydrogen peroxide, and separating hydrogen peroxide from the oxidized working solution, and recycling the oxidized working solution for further hydrogenation the improvement which comprises effecting oxidation of the working solution in the presence of a small amount, within the range of about 0.002% to about 0.25% by weight of ammonia.

6. A cyclic process for the production of hydrogen peroxide which comprises hydrogenating the working solution comprising an alkylated anthraquinone dissolved in a water-immiscible solvent to convert the anthraquinone to the hydroquinone with concomitant formation as a side reaction of tetrahydroanthraquinone resulting from the addition of hydrogen to the aromatic nucleus of the anthraquinone, oxidizing the hydrogenated working solution with elemental oxygen in the presence of a small amount, within the range of about 0.002% to about 0.25%, by weight of a water-soluble ionizable inorganic alkaline compound to convert anthrahydroquinones to the corresponding anthraquinone and produce hydrogen peroxide, adding a small amount of acid to the oxidized working solution and extracting hydrogen peroxide from said oxidized working solution by passing the oxidized solution in intimate contact with water, and recycling the resultant working solution for further hydrogenation.

7. A cyclic process for the production of hydrogen peroxide which comprises hydrogenating the working solution comprising an alkylated tetrahydroanthraquinone dissolved in a water-immiscible solvent to convert the alkylated tetrahydroanthraquinone to the alkylated tetrahydroanthrahydroquinone, oxidizing the hydrogenated working solution with elemental oxygen in the presence of a small amount, within the range of about 0.002% to about 0.25%, by weight of a water-soluble ionizable inorganic alkaline compound to convert the alkylated tetrahydroanthrahydroquinone to the corresponding alkylated tetrahydroanthraquinone, adding a small amount of acid to the oxidized working solution and extracting hydrogen peroxide from said oxidized working solution by passing the oxidized solution in intimate contact with water, and recycling the resultant working solution for further hydrogenation.

8. A cyclic process for the production of hydrogen peroxide which comprises hydrogenating the working solution comprising an alkylated tetrahydroanthraquinone dissolved in a water-immiscible solvent in the presence of a palladium catalyst to convert the alkylated tetrahydroanthraquinone to the alkylated tetrahydroanthrahydroquinone, oxidizing the hydrogenated working solution with elemental oxygen in the presence of a small amount, within the range of about 0.002% to about 0.25%, by weight of an alkali metal hydroxide to convert the alkylated tetrahydroanthrahydroquinone to the corresponding alkylated tetrahydroanthraquinone, adding an amount of acid at least equal to the weight of oxidation catalyst to the oxidized working solution and extracting hydrogen peroxide from said oxidized working solution by passing the oxidized solution in intimate contact with water, and recycling the resultant working solution for further hydrogenation.

9. A cyclic process for the production of hydrogen peroxide which comprises hydrogenating the working solution comprising an alkylated tetrahydroanthraquinone dissolved in a water-immiscible solvent to convert the alkylated tetrahydroanthraquinone to the alkylated tetrahydroanthrahydroquinone, oxidizing the hydrogenated working solution with elemental oxygen in the presence of a small amount, within the range of about 0.005% to 0.02%, by weight of sodium hydroxide to convert the alkylated tetrahydroanthrahydroquinone to the corresponding alkylated tetrahydroanthraquinone, adding 0.002% to 0.5% by weight of acid to the oxidized working solution and extracting hydrogen peroxide from said oxidized working solution by passing the oxidized solution in intimate contact with water, and recycling the resultant working solution for further hydrogenation.

10. A cyclic process for the production of hydrogen peroxide which comprises hydrogenating the working solution comprising an alkylated tetrahydroanthraquinone dissolved in a water-immiscible solvent to convert the alkylated tetrahydroanthraquinone to the alkylated tetrahydroanthrahydroquinone, oxidizing the hydrogenated working solution with elemental oxygen in the presence of a small amount, within the range of about 0.005% to 0.02%, by weight of ammonia to convert the alkylated tetrahydroanthrahydroquinone to the corresponding alkylated tetrahydroanthraquinone, adding 0.002% to 0.5% by weight of acid to the oxidized working solution by passing the oxidized solution in intimate contact with water, and recycling the resultant working solution for further hydrogenation.

References Cited in the file of this patent
UNITED STATES PATENTS

| | | |
|---|---|---|
| 2,158,525 | Riedl et al. | May 16, 1939 |
| 2,901,491 | Eller et al. | Aug. 25, 1959 |
| 2,909,532 | Cosley et al. | Oct. 20, 1959 |

OTHER REFERENCES

Walter C. Schumb: Hydrogen Peroxide, Reinhold Publishing Co., New York, N.Y., page 527 (1955).